Figures 1, 2:
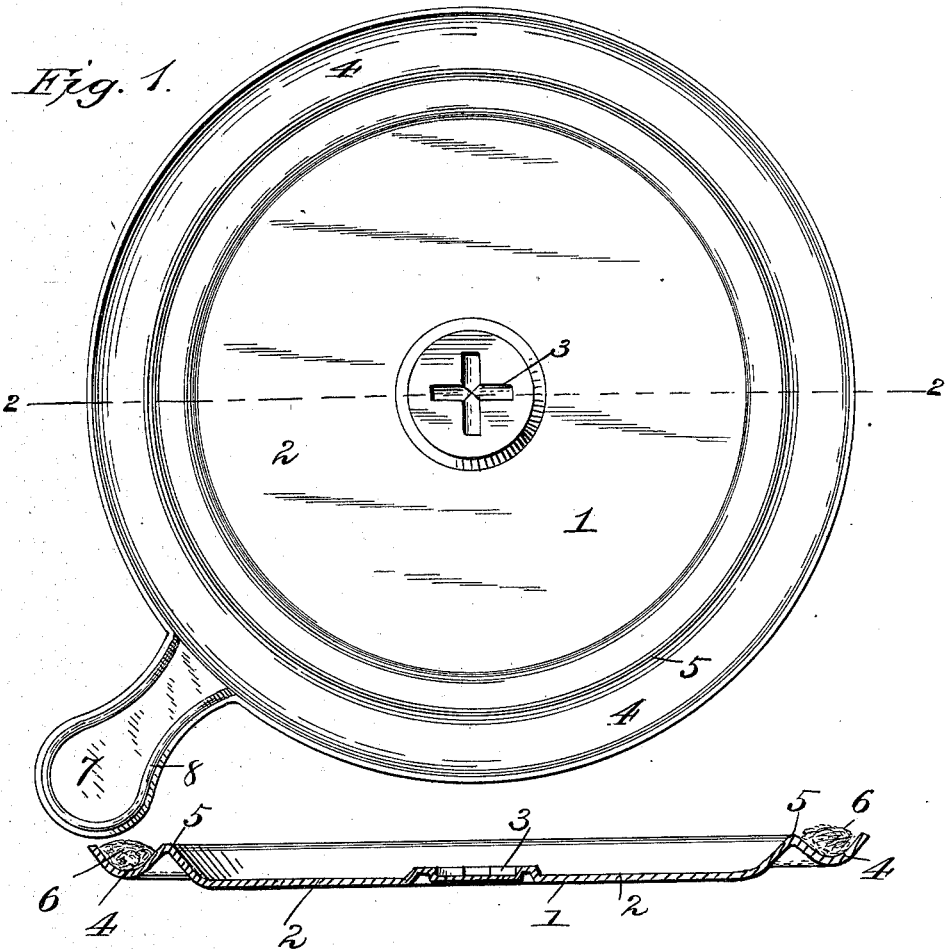

No. 731,842. PATENTED JUNE 23, 1903.
H. A. BIERLEY.
FLY TRAP.
APPLICATION FILED SEPT. 5, 1902.
NO MODEL.

Witnesses:
F. L. Orivand.
F. G. Radelfinger.

Inventor:
Henry A. Bierley,
By Lewis Bagger & Co.
Attorneys.

No. 731,842. Patented June 23, 1903.

UNITED STATES PATENT OFFICE.

HENRY A. BIERLEY, OF PORTSMOUTH, OHIO.

FLY-TRAP.

SPECIFICATION forming part of Letters Patent No. 731,842, dated June 23, 1903.

Application filed September 5, 1902. Serial No. 122,228. (No model.)

*To all whom it may concern:*

Be it known that I, HENRY A. BIERLEY, a citizen of the United States, residing at Portsmouth, in the county of Scioto and State of Ohio, have invented new and useful Improvements in Fly-Traps, of which the following is a specification.

My invention relates to fly-traps, and has for its object to construct a device of this character which will be provided with means for preventing the sticky material thereon from spreading and flowing over the edges. A handle is also provided to serve in handling the device.

The simple and novel construction employed by me in carrying out my invention is fully described in this specification and claimed, and illustrated in the accompanying drawings, forming a part thereof, in which—

Figure 1 is a plan view of my device. Fig. 2 is a section on the line 2 2, Fig. 1.

The body of my device is a circular disk 1, preferably constructed of paper. The center portion 2 is plain but for a cross 3 stamped therein to serve to hold bait. A groove 4 is formed adjacent to the edge of the disk, and a ridge 5 extends parallel to the groove 4. Mounted within the groove 4 and secured by some adhesive, such as glue, is a strip 6 of cotton. A handle 7, bordered by a groove 8 to lend stiffness thereto, is formed integral with the disk 1 to serve as means for handling the device.

When in use, the center plain portion 2 is coated with some sticky substance up to the ridge 5, which will serve to prevent its flowing off. If in spite of the ridge 5 should some of the sticky substance find its way over the ridge 5, it would be effectively prevented by the cotton strip 6 from going farther and running over the edge.

I do not wish to be limited as to details of construction, as these may be modified in many particulars without departing from the spirit of my invention.

Having described my invention, what I claim as new, and wish to secure by Letters Patent, is—

1. In a fly-trap, a disk covered with a sticky substance for catching flies, and a strip of cotton secured to said disk and forming an obstacle to prevent the said sticky substance running off said disk, substantially as described.

2. In a fly-trap, the combination of a disk covered with a sticky substance, a ridge surrounding said disk, and a strip of cotton surrounding said disk and located between the edge thereof and said ridge, substantially as described.

3. A fly-trap comprising a disk covered with a sticky substance and provided with a groove adjacent to the edge of said disk and a ridge between the groove and the sticky substance, and a strip of cotton secured within said groove to serve as a dam for preventing the sticky substance from flowing over the edge of the disk, substantially as described.

4. A fly-trap comprising a disk covered with a sticky substance and provided with a groove adjacent to the edge of the disk and a strip of cotton secured within said groove to act as a dam to prevent said sticky substance from flowing over the edge of the disk, substantially as described.

In testimony whereof I have hereunto set my hand in presence of two subscribing witnesses.

HENRY A. BIERLEY.

Witnesses:
FRANK G. RADELFINGER,
BENNETT S. JONES.